United States Patent
Yagi et al.

[15] 3,680,841
[45] Aug. 1, 1972

[54] LIQUID CHARACTERISTIC MEASURING INSTRUMENT

[72] Inventors: Eiichi Yagi; Kenko Kojima; Hisayuki Ikeda; Shiro Yauchi; Tsutomu Shimizu; Tokutaro Tamate; Hiroyuki Ikegawa, all of Tokyo, Japan

[73] Assignee: Kabushikaisha Yokogawa Denki Susakusho (Yokogawa Electric Works, Ltd.), Tokyo, Japan

[22] Filed: June 23, 1970

[21] Appl. No.: 48,992

[30] Foreign Application Priority Data

Oct. 23, 1969 Japan..........................44/100947

[52] U.S. Cl..................259/1 R, 73/71.5, 259/116, 259/DIG. 44
[51] Int. Cl. ..........................B01f 11/02, G01n 29/00
[58] Field of Search ........259/DIG. 41, DIG. 44, 1 R, 259/99, 114, 116; 73/71.5, 67.5, 67.6, 67.7, 67.8, 67.9; 340/8 LF, 8 MM

[56] References Cited

UNITED STATES PATENTS

| | | | |
|---|---|---|---|
| 3,443,797 | 5/1969 | Branson | 259/1 R X |
| 2,470,741 | 5/1949 | Gordon | 259/DIG. 44 |
| 2,729,692 | 1/1956 | Ratcliffe | 259/1 R X |
| 2,635,388 | 4/1953 | Peyches et al. | 259/DIG. 44 |
| 2,800,309 | 7/1957 | Giertz-Hedstrom | 259/1 R |
| 3,351,539 | 11/1967 | Branson | 259/1 R X |
| 3,402,386 | 9/1968 | Rodbell | 340/8 LF |

Primary Examiner—Walter A. Scheel
Assistant Examiner—Philip R. Coe
Attorney—Hill, Sherman, Meroni, Gross & Simpson

[57] ABSTRACT

A liquid characteristic measuring instrument having a container enclosing a liquid to be measured, an ultrasonic vibrator, and means for transmitting ultrasonic waves from the vibrator to the liquid in the container, in which precipitation of scale of the liquid being measured is prevented by the ultrasonic waves to ensure accurate measurement.

4 Claims, 5 Drawing Figures

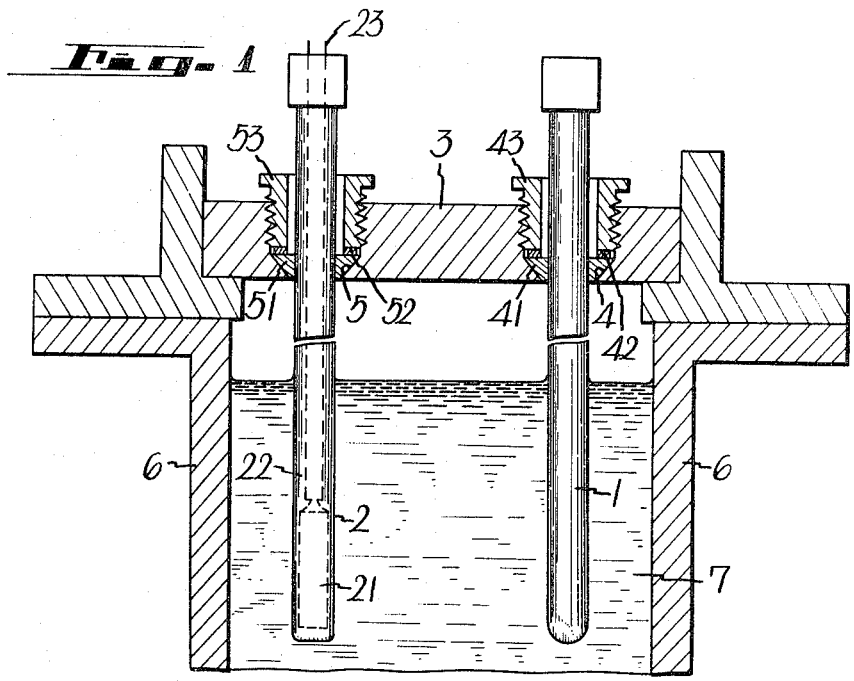
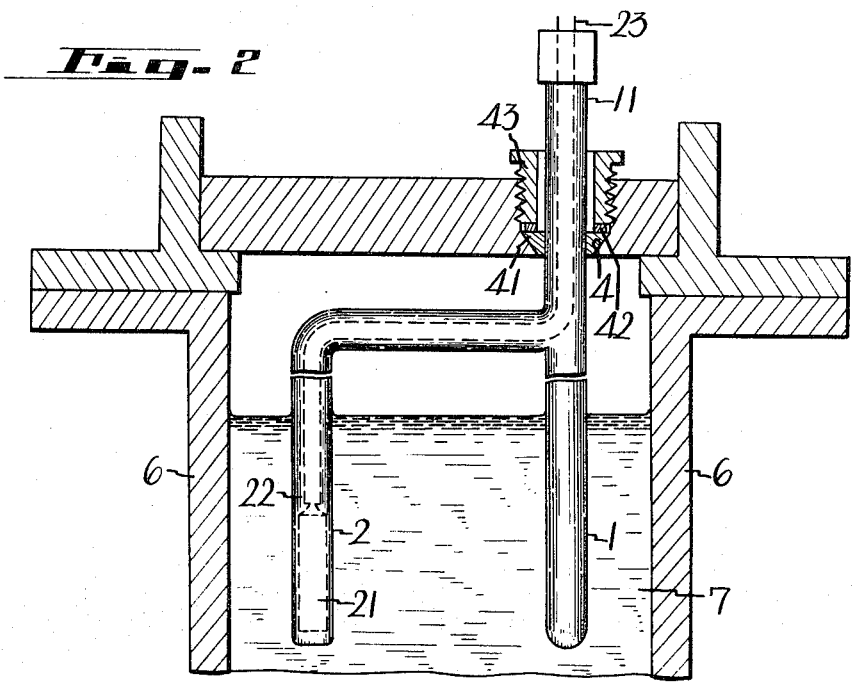

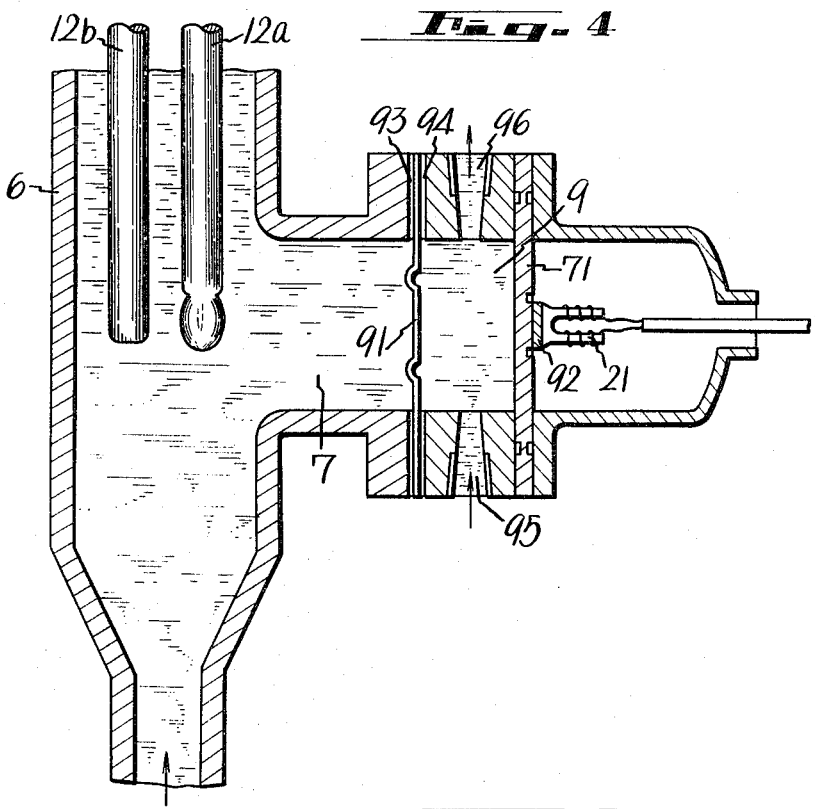
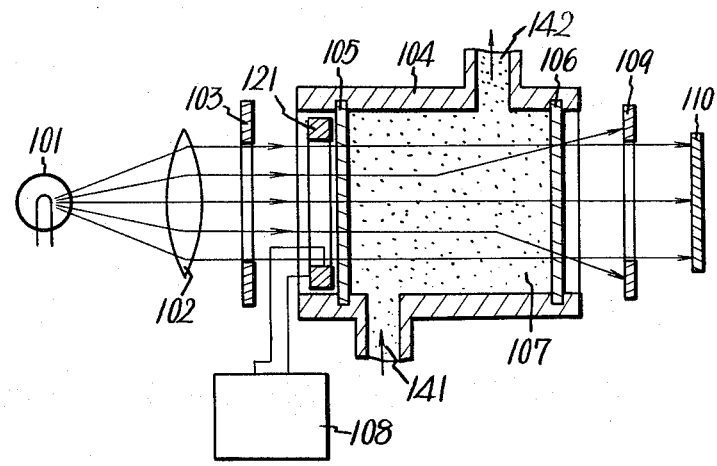

LIQUID CHARACTERISTIC MEASURING INSTRUMENT

BACKGROUND OF THE INVENTION

1. Field of the Invention

This invention relates to a liquid characteristic measuring instrument adapted for continuous measurement by removing sediments deposited on the electrode or preventing their formation through the use of ultrasonic waves.

2. Description of the Prior Art

For example, in the pH measurement, when a liquid to be measured is so thick that crystallization readily takes place, the surface of the glass electrode is covered with the precipitate. This causes a decrease in the potential gradient of the glass electrode and hence in its response speed, thus resulting in increased asymmetry potential difference. Further, deposition of the precipitate on the liquid junction of a reference electrode increases the apparent asymmetry potential difference of the glass electrode.

SUMMARY OF THE INVENTION

The primary object of this invention is to provide a liquid characteristic measuring instrument having an ultrasonic cleaner.

Another object of this invention is to provide a simply constructed and small liquid characteristic measuring instrument having an ultrasonic cleaner in which the mounting member for an ultrasonic vibrator is improved.

Another object of this invention is to provide a liquid characteristic measuring instrument which is excellent in the transmission efficiency of ultrasonic waves and in the cleaning effect thereby.

Still another object of this invention is to provide a liquid characteristic measuring instrument having an ultrasonic vibrator which is suitable for use with high-temperature or corrosive liquids.

Other objects, features and advantages of this invention will become apparent from the following description taken in conjunction with the accompanying drawings.

BRIEF DESCRIPTION OF THE DRAWINGS

FIG. 1 is a schematic diagram showing, partly in cross-section, one example of a liquid characteristic measuring instrument of this invention; and FIGS. 2 to 5 are respectively schematic diagrams, similar to FIG. 1, illustrating modified forms of this invention.

DESCRIPTION OF THE PREFERRED EMBODIMENTS

Figure 3:
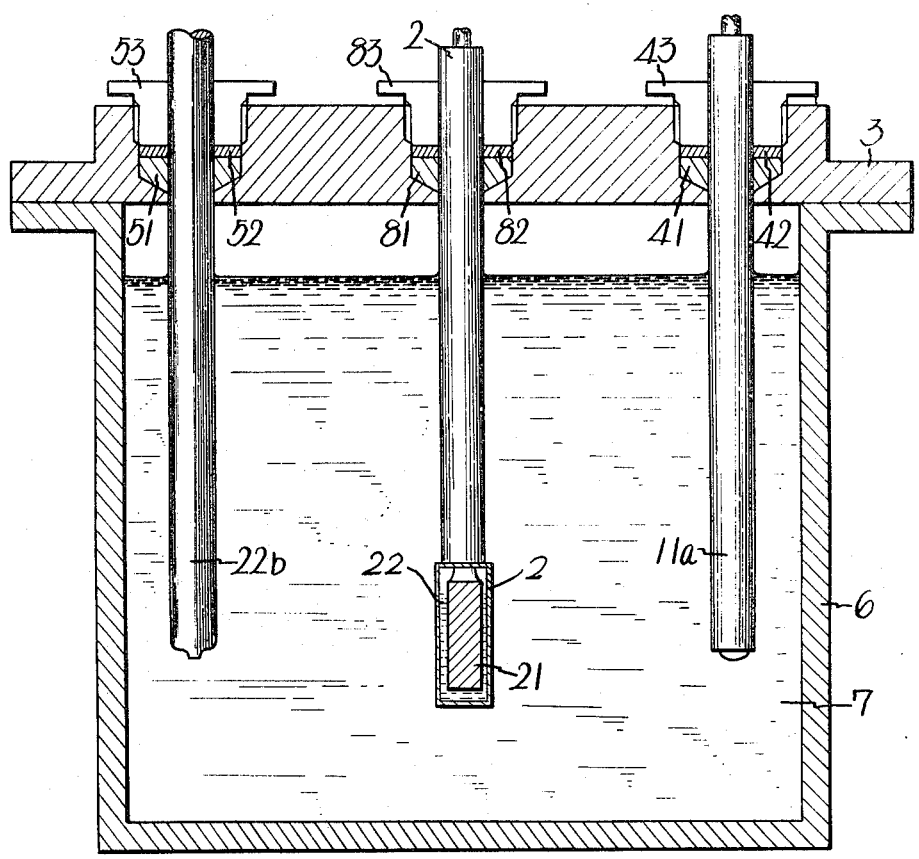

The following will describe this invention as being applied to a liquid concentration measuring instrument. In FIG. 1 reference numeral 1 indicates an electrode, 2 a protective tube having housed therein an ultrasonic vibrator 21, and 3 a plate supporting the electrode 1 and the protective tube 2. The support plate 3 has bored therein apertures 4 and 5 adjacent to each other, the upper half portions of which are threaded and the lower half portions of which are tapered as clearly shown in FIG. 1, and the electrode 1 and the protective tube 2 are respectively inserted into the apertures. Reference numerals 41 and 51 designate packings inserted into the tapered portions of the apertures 4 and 5, 42 and 52 washers, and 43 and 53 screws threadably engaged with the threaded portions of the apertures 4 and 5. The electrode 1 and the protective tube 2 are fixed to the support plate 3 by pressing down the packings 41 and 51 with the screws 43 and 53 respectively. The protective tube 2 has housed therein the aforementioned ultrasonic vibrator 21 and is filled with a liquid material 22 which does not corrode the vibrator 21 and can transmit the ultrasonic wave effectively. The liquid material 22 is preferred to be water, silicone oil or the like. The ultrasonic vibrator 21 is connected through a lead 23 to an ultrasonic generator (not shown). Reference numeral 6 indicates a side wall of a case in which a liquid 7 to be measured is filled.

With a densitometer of such an arrangement, when the ultrasonic vibrator 21 is vibrated by the output of the ultrasonic generator, the vibration is transmitted to the electrode 1 through the liquid material 22, the protective tube 2 and the liquid 7 to be measured, by which sediments on the electrode 1 are removed or their formation is prevented.

In the liquid concentration measuring instrument of this invention the electrode 1 and the protective tube 2 enclosing therein the ultrasonic vibrator 21 are affixed to the support plate 3 in substantially the same manner, so that parts can be used in common to both of them and this leads to simplification and miniaturization of the overall construction of the instrument and allows ease in handling and in maintenance. Further, the protective tube 2 is detachably attached to the support plate 3 by means of screw and packing, and accordingly the ultrasonic vibrator can be used with other instruments. In addition, the ultrasonic vibrator 21 is enclosed in the protective tube 2 together with the liquid material 22 for the purpose of enhancement of the transmission efficiency of ultrasonic waves, and the ultrasonic waves produced by the vibrator 21 are transmitted to the protective tube 2 with high efficiency, thereby ensuring very effective cleaning of the electrode 1.

In FIG. 2 there is illustrated a modified form of this invention, in which the protective tube 2 is divided from the electrode 1 at the intermediate portion thereof. Namely, the protective tube 2 having housed therein the ultrasonic vibrator 21 is divided from the electrode 1 within the case filled with the liquid 7 to be measured and accordingly the protective tube 2 is formed integral with the electrode 1. The support plate 3 has bored therein an aperture 4 threaded at the upper half portion and tapered at the lower half portion in the same manner as previously described with FIG. 1 and the common base 11 of the electrode 1 and the protective tube 2 is inserted into the aperture 4. The base 11 is affixed to the support plate 3 by the packing 41, the washer 42 and the screw 43. The instrument exemplified in FIG. 2 requires only one aperture bored in the support plate 1 and packing, washer and screw for attaching the protective tube 2 and the electrode 1 to the support plate 3 respectively, so that the instrument of FIG. 2 is simpler in construction than that of FIG. 1.

FIG. 3 shows another modification of this invention, in which an electrostrictive vibrator is interposed between two electrodes and ultrasonic waves generated from both sides of the electrostrictive vibrator are caused to act on the two electrodes, thereby ensuring efficient cleaning of the electrodes. In the figure reference numeral 6 designates the side wall of a container filled with the liquid 7 to be measured as in the foregoing examples and 3 a cover or support plate of the container. Reference numerals 11a and 22b indicate electrodes and in the case of a pH meter the electrodes 11a and 22b respectively correspond to the glass electrode and the reference electrode. The electrodes 11a and 22b pass through the cover 3 and are affixed to the latter by the screws 43 and 53, the washers 42 and 52 and the packings 41 and 51, as in the foregoing examples, in such a manner that the lower ends of the electrodes are immersed in the liquid 7 being measured. Reference numeral 21 indicates an ultrasonic vibrator such, for example, as an electrostrictive vibrator and 2 a protective tube for protecting the electrostrictive vibrator 21 from the liquid 7 to be measured. The protective tube 2 has enclosed therein the electrostrictive vibrator 21 and a liquid material (not shown in this example) to provide for enhanced transmission efficiency of ultrasonic waves generated by the vibrator 21. The protective tube 2 is located substantially midway between the electrodes 11a and 22b and is attached by a screw 83, a washer 82 and a packing 81 to the cover 3 in such a manner that the vibrator 21 is immersed in the liquid 7.

With such an arrangement, when the electrostrictive vibrator 21 is vibrated by the output of a ultrasonic generator (not shown) the vibration is transmitted through the liquid material filled in the projective tube 2 to both sides of the protective tube 2 at substantially the same intensity. The vibration is thus transmitted to the electrodes 11a and 22b through the liquid 7 to be measured, thereby removing precipitates on the electrodes or preventing the formation of the precipitates.

With the construction shown in FIG. 3 in which the electrostrictive vibrator 21 is disposed between the two electrodes 11a and 22b and use is made of the ultrasonic waves generated from the both sides of the electrostrictive vibrator 21, the vibration of the vibrator is efficiently propagated in the medium and consequently both electrodes can be efficiently cleaned. Accordingly, the present invention provides advantages in practical use such as small power consumption for actuating the vibrator, reduction in the size of the measuring instrument and simple construction, as compared with prior art measuring instruments.

FIG. 4 illustrates another modified form of this invention as being applied to a flowing-type pH measuring instrument, in which a chamber is provided between an oscillatory plate having mounted thereon an ultrasonic vibrator and a liquid to be measured and cooling agent such as water is supplied to the chamber in a manner to be in contact with the liquid to be measured through an anti-corrosive film as of metal, a high molecular compound or the like so that the instrument may be used under high-temperature conditions or used with a corrosive liquid. In FIG. 4 reference numeral 6 indicates a side wall of a container for enclosing the liquid 7 to be measured, 12a a glass electrode, 12b a reference electrode and 9 a chamber for the cooling water which is attached to the flange of the side wall 6 of the container. The wall of the chamber 9 for the cooling water on the side of the liquid 7 is a thin film 91 as of metal, high molecular compound or like material. The thin film 91 contacts the liquid 7 and the wall on the opposite side from the liquid 7 serves as an oscillatory plate 71. The oscillatory plate 71 has fixedly mounted thereon an ultrasonic vibrator 21, for example, a magneto-strictive element as of ferrite attached with an adhesive binder 92. Reference numerals 93 and 94 identify packings for sealing the thin film 91 to the container 6, 95 an inlet port for introducing the cooling water into the chamber 9, and 96 an outlet for the cooling water. The cooling water flows upward.

With such an arrangement, ultrasonic vibration of the magneto-strictive element 21 leads to ultrasonic vibration of the oscillatory plate 71 and the vibration of the oscillatory plate 71 is transmitted to the liquid 7 being measured through the cooling water in the chamber 9 and the thin film 91, thereby cleaning the glass electrode 12a and the reference electrode 12b with ultrasonic waves. With the cooling water flowing at all times, even if the temperature of the liquid being measured is high, the high temperature is barely transmitted to the oscillatory plate 71, so that the magneto-strictive element 21 does not come off of the oscillatory plate 71. Further, if the liquid 7 to be measured is corrosive, the oscillatory plate 71 is not corroded by the liquid because it is separated by the anti-corrosive thin film 91 from the liquid being measured.

In the foregoing example the cooling water flows upward for the purpose of preventing formation of bubbles in the cooling water and removing the bubbles generated in the water but the flowing direction of the cooling water is not limited specifically to the upward direction.

In case cooling is not required, the inlet port 95 for the cooling water is closed with a blank cap and water or other liquid is filled in the chamber 9.

For improving the transmission efficiency of the ultrasonic waves, the thin film 91 is preferred to be of less rigidity, for example, corrugated as depicted in FIG. 4.

With such an arrangement as shown in FIG. 4 in which the chamber for a liquid is provided between the oscillatory plate having the ultrasonic vibrator mounted thereon and the liquid to be measured so as to contact the first-mentioned liquid with the liquid being measured through the thim film, the measuring instrument is excellent in thermal resistance and in corrosion resistance.

FIG. 5 illustrates another modification of this invention as being applied to a liquid turbidity measuring instrument, in which reference numeral 101 indicates a light source, 102 a lens, 103 an iris and 104 a bath for enclosing a liquid 107 to be measured, these elements being aligned in the order as shown in the figure. Reference numerals 105 and 106 designate transparent windows provided on both sides of the bath 104 and 121 a ring thickness vibration type vibrator attached to the outside of the transparent window 105 on the side of the light source 101. The vibrator 121 is made of barium titanate or zircon, lead titanate and so on. The vibrator 121 is produced by mixing the above raw materials at a certain ratio, sintering and molding the mixture into a ring shape under high temperature and high pressure conditions and subjecting the mold to polarization treatment after depositing electrodes on both sides thereof. Reference numeral 108 designates a high-frequency oscillator and 109 and 110 light detectors or photo electric converter such as photocell for converting incident light into the quantity of electricity corresponding thereto and the light detector 109 on the side of the bath 104 is annularly formed.

In the instrument of the above construction the liquid 107 to be measured flows into the bath 104 through an inlet port 141 and out therefrom through an outlet port 142. At this time, the vibrator 121 vibrates at high frequencies in its axial direction (or in the direction of its thickness) when supplied with a high-frequency voltage such, for example, as 150 to 200 KHz produced by the high-frequency oscillator 108. Ultrasonic waves generated by the vibrator 121 vibrate the liquid 107 in the bath 104 through the transparent window 105 and the other transparent window 106 through the liquid 107. The ultrasonic waves cause a cavitation effect in the liquid 107 being measured or a phenomenon such as vibration or disturbance of the liquid 107, thereby preventing blurring of the transparent windows 105 and 106 resulting from deposition of suspension particles in the liquid 107 being measured. Light emanating from the light source 101 is rendered by the lens 102 into parallel beams of light and enters into the liquid 107 in the bath 104 through the transparent window 105. The present instrument is adjusted such that in the absence of the suspension particles in the liquid 107 being measured the incident light passes through the bath 104 to irradiate only the light detector 110. In the presence of the suspension particles in the liquid to be measured, one portion of the incident light is scattered by the particles to irradiate the annular light detector 109. Since the ratio of amounts of the light having passed through the liquid and the scattered light are in proportion to the concentration of the suspension particles in the liquid, namely to the turbidity of the liquid, it is possible to achieve accurate measurement of the turbidity of the liquid by calculating the ratio of the electric outputs of the light detectors 109 and 110.

Although the present example has been described as applied to the turbidimeter for measuring the turbidity of the liquid, it is a matter of course that the example is applicable to a colorimeter for measuring the color concentration of a fluid or a smoke indicator for measuring the smoke concentration in gas.

As will be seen from the foregoing, the present embodiment provides a measuring instrument which may be used with low frequency voltage, inexpensive and easy to produce because ultrasonic cleaning is achieved by means of the annular vibrator attached to the transparent window of the turbidemeter or like instrument utilizing light. Further, since the vibrator is annularly formed, it does not adversely affect the passage of the light for measurement. With the vibrator being mounted only on the outside of the transparent window on the side of the light source as in the foregoing example, the arrangement requires only one vibrator and consequently further reduces the cost of the instrument and prevents break down, since there is no danger that the vibrator will be corroded by the liquid being measured.

It will be apparent that many modifications and variations may be effected without departing from the scope of the novel concepts of this invention.

We claim as our invention:

1. A liquid characteristic measuring instrument comprising a container having a liquid therein whose characteristic is to be measured, said liquid having a tendency to deposit a material therefrom which interferes with such measurement, at least one electrode capable of measuring such characteristic disposed in said liquid, a cover on said container, a protective tube secured to said cover and extending into said liquid, an ultrasonic vibrator located in said protective tube, and means for energizing said vibrator to emit ultrasonic waves into said liquid to inhibit substantially the tendency of said liquid to deposit such material on said electrode.

2. The instrument of claim 1 in which both said electrode and said protective tube are removably secured to said cover.

3. The instrument of claim 2 in which said protective tube includes a liquid for coupling the ultrasonic vibrations to the liquid in said container.

4. The instrument of claim 2 which includes a pair of electrodes, the protective tube being disposed between the two electrodes.

* * * * *